(12) United States Patent
Kobayashi et al.

(10) Patent No.: US 7,885,755 B2
(45) Date of Patent: Feb. 8, 2011

(54) FUEL INJECTION AMOUNT CONTROL APPARATUS OF INTERNAL COMBUSTION ENGINE

(75) Inventors: Daisuke Kobayashi, Kariya (JP); Satoshi Masuda, Kariya (JP)

(73) Assignees: Toyota Jidosha Kabushiki Kaisha, Toyota-shi (JP); Denso Corporation, Kariya-shi (JP)

( * ) Notice: Subject to any disclaimer, the term of this patent is extended or adjusted under 35 U.S.C. 154(b) by 70 days.

(21) Appl. No.: 12/438,007

(22) PCT Filed: Aug. 28, 2007

(86) PCT No.: PCT/JP2007/067102

§ 371 (c)(1),
(2), (4) Date: Feb. 19, 2009

(87) PCT Pub. No.: WO2008/026755

PCT Pub. Date: Mar. 6, 2008

(65) Prior Publication Data

US 2010/0042308 A1   Feb. 18, 2010

(30) Foreign Application Priority Data

Aug. 28, 2006   (JP)   .............................. 2006-230961

(51) Int. Cl.
*B60T 7/12*     (2006.01)
*G05D 1/00*     (2006.01)
*G06F 7/00*     (2006.01)
*G06F 17/00*    (2006.01)

(52) U.S. Cl. ...................... 701/104; 701/113; 123/435; 123/491; 123/494

(58) Field of Classification Search ................. 701/102, 701/103, 113; 123/406.47, 406.55, 435, 123/578, 179.16, 198 E, 491, 494, 678, 148.21, 123/184.31, 184.53, 184.55
See application file for complete search history.

(56) References Cited

U.S. PATENT DOCUMENTS 7,258,107 B2 *   8/2007   Johnson et al. ............. 123/435

(Continued)

FOREIGN PATENT DOCUMENTS

EP      1 637 722      3/2006

(Continued)

OTHER PUBLICATIONS

New model car instruction manual, service manual of TOYOTA Century, Apr. 2000, edited by TOYOTA Motor Corporation, issued by the service division.

*Primary Examiner*—Stephen K Cronin
*Assistant Examiner*—Anthony L Bacon
(74) *Attorney, Agent, or Firm*—Oblon, Spivak, McClelland, Maier & Neustadt, L.L.P.

(57) ABSTRACT

A fuel injection amount control apparatus controlling an amount of fuel supplied to an internal combustion engine is disclosed. An intake passage extends from the engine, and the intake passage is branched into a plurality of branch passages in an upstream section. The apparatus includes a plurality of intake air temperature sensors and an ECU. Each of the intake air temperature sensors is provided in one of the intake passages and detects an intake air temperature in the corresponding intake passage. The ECU selects an intake air temperature that most directly expresses the engine state or the environment from the intake air temperatures detected by the intake air temperature sensors. The ECU controls the amount of the fuel supplied to the engine by using the selected intake air temperature.

7 Claims, 5 Drawing Sheets

U.S. PATENT DOCUMENTS

2004/0015288 A1  1/2004  Wolber et al.
2006/0069492 A1  3/2006  Muto et al.

FOREIGN PATENT DOCUMENTS

JP  8 240144  9/1996
WO  02 20966  3/2002

* cited by examiner

Fig.5 ns as an intake air temperature sensor be provided in each of the intake passages in a section upstream of the branch position.

FUEL INJECTION AMOUNT CONTROL APPARATUS OF INTERNAL COMBUSTION ENGINE

FIELD OF THE INVENTION

The present invention relates to a fuel injection amount control apparatus of an internal combustion engine having intake air temperature sensors each provided in one of a plurality of intake passages.

BACKGROUND OF THE INVENTION

Air is introduced to combustion chambers of an internal combustion engine through intake passages. The intake air amount is one of parameters reflecting an engine operating state together with an engine rotation speed. An engine control amount according to which the engine operating state is controlled, for example, a fuel injection amount or an ignition timing is set on the basis of the intake air amount. The intake air amount mentioned above is generally determined on the basis of a detection signal from an air flow meter provided in the intake passage.

In recent years, hot wire air flow meters have been mainly used. A hot wire air flow meter has a hot wire and a temperature gauge, which constitute a bridge circuit. The hot wire includes a heat generating resistor which generates heat by a supply of an electric power. The temperature gauge detects a temperature of intake air. In the hot wire air flow meter, when the intake air amount is changed, a heat quantity drawn from the hot wire is changed. The air flow meter determines the intake air amount by utilizing this principle. Specifically, the temperature of the intake air is detected by the temperature gauge mentioned above. The electric power supplied to the hot wire is controlled in such a manner that the temperature of the hot wire is kept higher by a fixed temperature than the detected intake air temperature. The intake air amount is detected on the basis of the change of the electric power at this time.

In recent years, large displacement V engines have been employed in vehicles for the purpose of a further higher power of internal combustion engines. For example, a non-patent document 1 (new model car instruction manual, service manual of TOYOTA Century, April 2000, edited by TOYOTA Motor Corporation, issued by the service division) discloses one example of an engine system in the large displacement V-engine. In this engine system, in order to improve a reduction of pressure loss of the intake air, and a mountability of the internal combustion engine to the vehicle, a part of the intake system is branched into two systems. It becomes easy to enlarge the total flow passage area of the intake passage by branching the intake system, specifically, the intake passage into two systems as mentioned above, and the pressure loss of the intake air flowing within the intake passage is lowered. Further, since this adds to the flexibility of design of the engine, the mountability to the vehicle is improved.

However, in such an intake passage structure that the intake passages of two systems are combined in a downstream side of the intake passage, for example, in an upstream section in the throttle valve, a turbulent flow of the intake air tends to be generated in a section downstream of the combined portion. Accordingly, even if the air flow meter mentioned above is provided in a portion in which the turbulent flow of the intake air tends to be generated, it is hard to obtain an accurate intake air amount. Thus, in the case of the engine system mentioned above, it is unavoidable that an air flow meter that also func- In the structure mentioned above, there is a case that the air flow meter is affected by the internal combustion engine main body, which is a heat source, depending on a mounted position. Particularly, during starting of the engine start, there is a high possibility that the air flow meters provided in the respective intake passages, more specifically, the respective intake air temperature sensors detect different intake air temperatures from each other. In this case, there is a risk that it is impossible to obtain the accurate intake air temperature information of the engine system, and moreover, it is hard to achieve a suitable fuel injection amount control with respect to the engine.

SUMMARY OF THE INVENTION

Accordingly, it is an objective of the present invention to provide a fuel injection amount control apparatus which achieves a suitable fuel injection amount control in an internal combustion engine provided with a plurality of intake passages.

In order to achieve the objective mentioned above, in accordance with one aspect of the present invention, a fuel injection amount control apparatus controlling an amount of fuel supplied to an internal combustion engine in correspondence to at least a temperature of air taken into the engine is provided. An intake passage extends from the engine, and the intake passage is branched into a plurality of branch passages in an upstream section. The apparatus includes a plurality of intake air temperature sensors and a control portion. Each intake air temperature sensor is provided in one of the intake passages, and detects an intake air temperature in the corresponding intake passage. The control portion controls an amount of the fuel supplied to the engine by using a control command value, in correspondence to an engine state or an environment estimated on the basis of the intake air temperatures detected by the intake air temperature sensors. When estimating the engine state or the environment, the control portion selects an intake air temperature that most directly expresses the engine state or the environment to be estimated from the intake air temperatures detected by the intake air temperature sensors, and controls the amount of the fuel supplied to the engine by using the control command value corrected on the basis of the selected intake air temperature.

DETAILED DESCRIPTION OF THE PREFERRED EMBODIMENTS

A description will be given below of a fuel injection amount control apparatus of an internal combustion engine in accordance with a first embodiment of the present invention with reference to FIGS. 1 to 3.

Figure 1:
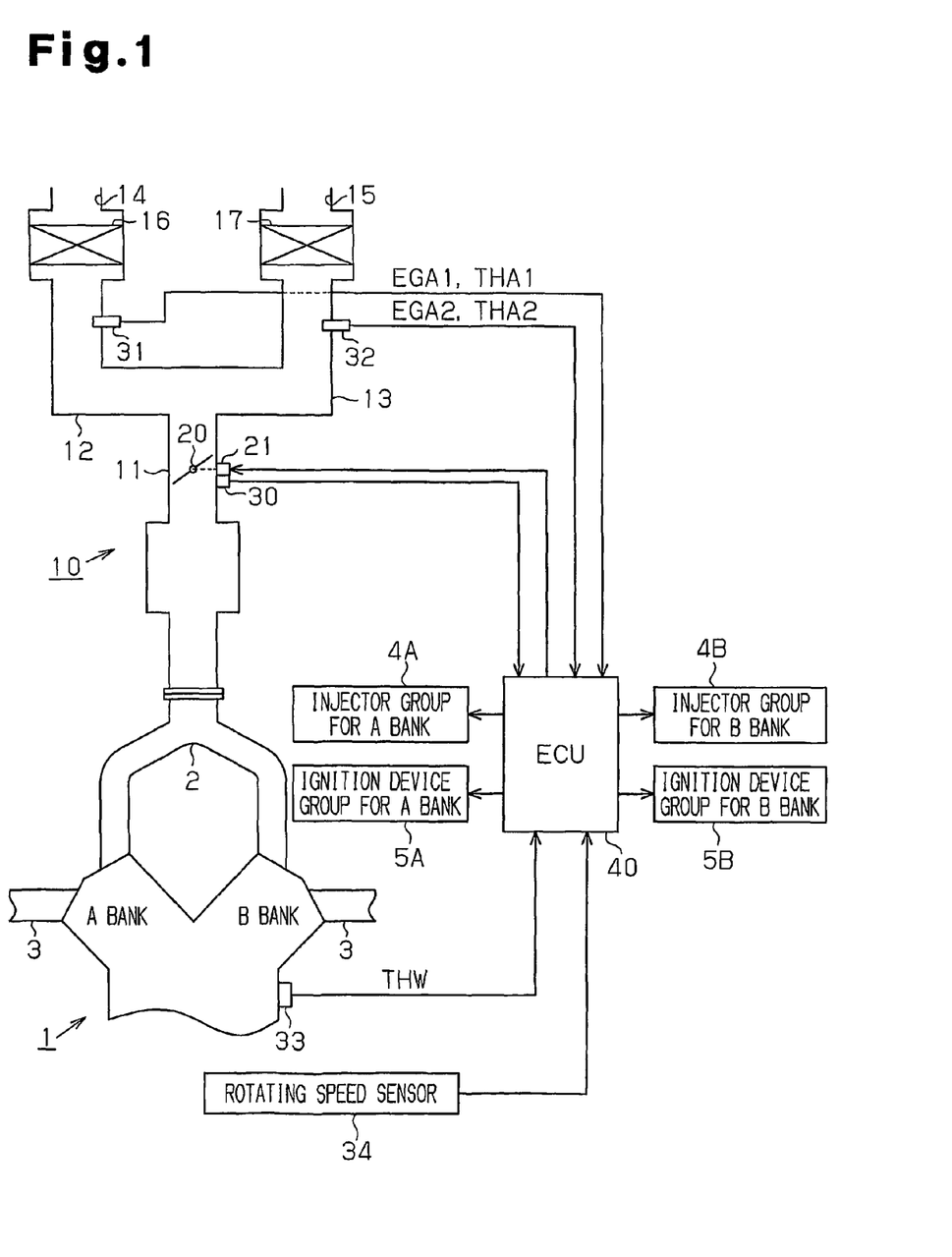
FIG. 1 is a schematic view showing an engine system to which a fuel injection amount control apparatus in accordance with a first embodiment of the present invention is applied.

As shown in FIG. 1, the fuel injection amount control apparatus in accordance with the present embodiment is applied, for example, to a V-8 engine system mounted to a vehicle. An engine main body 1 in the engine system is provided with a first bank A and a second bank B each having four cylinders.

An intake manifold 2 is connected to both of the first bank A and the second bank B. Exhaust manifolds 3 are respectively connected to the first bank A and the second bank B. The intake manifold 2 introduces an intake air to a combustion chamber formed in each of the cylinders. Each exhaust manifold 3 discharges an exhaust gas from the combustion chambers in each of the corresponding banks. The intake manifold 2 has a plurality of branch passages corresponding to a number of the cylinders. A combined portion of a plurality of branch passages is connected to the intake passage 10.

The first bank A is provided with an injector group 4A for the first bank A. The second bank B is provided with an injector group 4B for the second bank B. Fuel of a predetermined pressure is supplied to the injector groups 4A and 4B from a fuel tank via a delivery pipe (not shown), and accumulator piping. Each of the injectors constituting the injector groups 4A and 4B is controlled by an electromagnetic valve so as to be opened and closed, and injects a fuel to the corresponding combustion chamber. A fuel injection time and, by extension, a fuel amount injected to each of the combustion chambers are controlled on the basis of a valve opening time by the electromagnetic valve. Further, the first bank A and the second bank B are respectively provided with an ignition device group 5A for the first bank A and an ignition device group 5B for the second bank B. Each of the ignition devices constituting the ignition device groups 5A and 5B ignites an air-fuel mixture of the fuel and the intake air introduced into the combustion chamber. A rectilinear movement of the piston in each of the cylinders in accordance with the combustion of the air-fuel mixture is converted into a rotating movement of a crankshaft via a connecting rod, whereby power of the engine is obtained.

The intake passage 10 has a junction passage 11 provided with a surge tank and a throttle body, a first branch passage 12 and a second branch passage 13 branched in an upstream side of the junction passage 11. The first branch passage 12 has in its upstream section an intake port 14 for introducing air from the outside to the intake passage 10 and an air cleaner 16. The second branch passage 13 has in its upstream section an intake port 15 for introducing the air from the outside to the intake passage 10 and an air cleaner 17. The intake air introduced into the intake passage 10 from the intake ports 14 and 15 is cleaned by the air cleaners 16 and 17. Further, the throttle body positioned in a section upstream of the surge tank of the junction passage 11 is provided with a throttle valve 20 for regulating an intake air amount introduced to the combustion chambers from the intake passage 10. The throttle valve 20 is selectively opened and closed through an actuator 21 on the basis of an operation of an accelerator pedal (not shown).

The engine system is provided with various types of sensors for detecting an operating state of the engine. For example, a throttle sensor 30 detecting an opening degree of the throttle valve 20 is provided near the throttle valve 20 mentioned above. A first air flow meter 31 detecting a flow rate EGA1 of an air of the first branch passage 12 is located downstream of the air cleaner 16 of the first branch passage 12. A second air flow meter 32 detecting a flow rate EGA2 of an air of the second branch passage 13 is located downstream of the air cleaner 17 of the second branch passage 13. Each of the air flow meters 31 and 32 also functions as an intake air temperature sensor. The intake air temperature sensor detects each of a first intake air temperature THA1 corresponding to a temperature of the air flowing through the first branch passage 12, and a second intake air temperature THA2 corresponding to a temperature of the air flowing through the second branch passage 13. Further, the engine main body 1 is provided with a coolant temperature sensor 33 detecting a temperature THW of coolant, and a rotating speed sensor 34 detecting a rotating speed of the crankshaft mentioned above.

Signals from each of the sensors 30 to 34 are input to an electronic control unit, that is, an ECU 40. The ECU 40 is provided with a central processing unit (CPU), a program memory (ROM), a data memory (RAM), an input and output circuit, and a drive circuit, and controls the entire engine system. In other words, the ECU 40 executes various types of engine control procedures for controlling, for example, a fuel injection amount and ignition timing on the basis of the signal from each of the sensors 30 to 34 mentioned above. Specifically, the ECU 40 drives the injector group 4A, the ignition device group 5A provided in the first bank A of the engine main body 1 and the injector group 4B, the ignition device group 5B provided in the second bank B. In the fuel injection amount control, the ECU 40 calculates the fuel injection amount on the basis of the engine operating state, for example, the engine rotation speed, the throttle opening degree, the coolant temperature THW, and the first and second intake air temperatures THA1 and THA2. Further, a time for opening the valve of each of the injector groups 4A and 4B, that is, a fuel injection time TAU is further calculated on the basis of the calculated fuel injection amount and fuel pressure, and the injector groups 4A and 4B are selectively opened and closed on the basis of the calculated fuel injection time TAU, and the fuel amount injected into each of the combustion chambers is controlled.

As mentioned above, in the case that the intake air temperature sensor (the air flow meters 31 and 32) are provided for the respective branch passages 12 and 13, there is a case that the intake air temperature sensors detect different intake air temperatures from each other, particularly in a state in which a stationary intake air flow is not generated, for example, during starting of the engine. Even in these cases, it is important to execute a reliable fuel injection amount control on the basis of the intake air temperature information having a high adequacy so as to start the engine, thereby introducing an autonomic operation, particularly during starting of the engine.

Further, under a high temperature, there is a case that a fuel vapor is generated in the air-fuel mixture. In this case, there is a risk that the air-fuel ratio becomes lean and a start defect of the engine is caused. Since it is impossible to directly check out whether the fuel vapor exists, it is necessary to estimate the fuel vapor from, for example, the coolant temperature and the intake air temperature. In the case that an engine environment exists in a warm-up environment region, a suitable fuel amount is supplied to the combustion chamber by extending the fuel injection time. Accordingly, it is possible to prevent the air-fuel ratio from becoming lean due to the generation of the fuel vapor. Then, in accordance with this embodiment, it is estimated whether the engine environment at a time of starting exists in the so-called warm-up environment region, in which the fuel vapor is generated in the air-fuel mixture. Specifically, it is determined whether the fuel injection amount should be increased on the basis of the larger value of the first intake air temperature THA1 and the second intake air temperature THA2.

Figure 2:
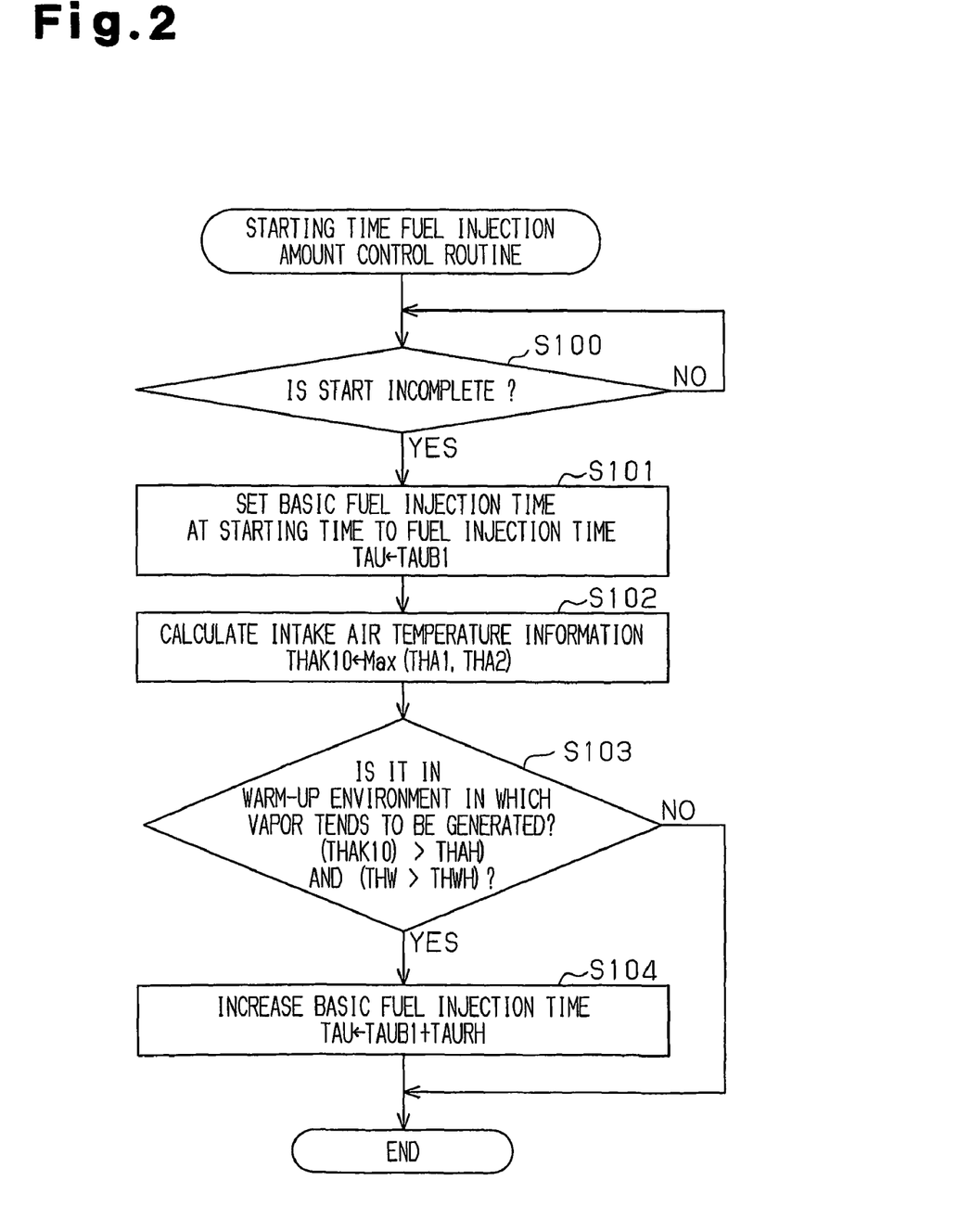
FIG. 2 is a flowchart showing the procedure of fuel injection amount control executed in the fuel injection amount control apparatus in FIG. 1.

FIG. 2 shows a control procedure of the fuel injection amount control in accordance with the present embodiment. A description will be given below of the control procedure on the basis of FIG. 2.

In the fuel injection amount control, it is determined whether the starting of the engine is incomplete, that is, whether the engine is still operating without reaching the autonomic operation in step S100. Specifically, it is determined that the start is incomplete, for example, if the engine speed detected through the rotating speed sensor 34 has not reached a predetermined value, or if a predetermined time has not passed after the detected engine speed reached the predetermined value.

In the case that the start of the engine is incomplete, a basic fuel injection time TAUB1 of the time of starting is set to a fuel injection time TAU in step S101. Specifically, the basic fuel injection time TAUB1 is calculated on the basis of a coolant temperature THW and a fuel pressure at a time of starting the engine, and the calculated basic fuel injection time TAUB1 is set as the fuel injection time TAU. In this connection, a relation between the coolant temperature THW and the fuel pressure, and the basic fuel injection time TAUB1 is stored as a function map in the program memory (ROM) of the ECU 40, and the ECU 40 calculates the basic fuel injection time TAUB1 with reference to the function map.

Subsequent to the process in step S101, the intake air temperature information is calculated in step S102. At this time, in the present embodiment, as mentioned above, the first intake air temperature THA1 detected from the first air flow meter 31 also functioning as the intake air temperature sensor is compared with the second intake air temperature THA2 detected from the second air flow meter 32 also functioning as the intake air temperature sensor. A higher temperature value is selected from the first intake air temperature THA1 and the second intake air temperature THA2, and the value is set to an intake air temperature information THAK10 at that time point. As mentioned above, in the warm-up environment in which the fuel vapor tends to be generated in the air-fuel mixture, a larger value is selected from the first intake air temperature THA1 and the second intake air temperature THA2. This selection has a high adequacy for deciding a control command value described below about the fuel injection amount. In other words, this selection is a selection having a high adequacy, that is, an acceptable selection for correcting the control command value so as to prevent the air-fuel ratio from becoming lean due to the generation of the fuel vapor.

Subsequent to the process of step S102, it is determined in step S130 whether the engine environment exists in the warm-up environment region, in which the fuel vapor tends to be generated in the air-fuel mixture injected from the injector groups 4A and 4B. Specifically, in the case that the intake air temperature information THAK10 is more than a warm-up determining value THAH in connection with the intake air temperature, and a coolant temperature THW detected through the coolant temperature sensor 33 is more than a warm-up determining value THWH in connection with the coolant temperature, it is determined that the engine environment exists in the warm-up environment region, in which the fuel vapor tends to be generated in the air-fuel mixture. In this connection, both of the warm-up determining value THAH and the warm-up determining value THWH are previously determined on the basis of experiments or the like, and are stored in the program memory (ROM) or the like of the ECU 40.

When it is determined that the engine environment exists in the warm-up environment region, in which the fuel vapor tends to be generated in the air-fuel mixture through the determining process of step S103, the basic fuel injection time is increased in the following step S104. Specifically, the fuel injection time TAU is determined by adding a correction time TAURH to the basic fuel injection time TAUB1. The correction time TAURH is determined as a value which can prevent the air-fuel ratio from becoming lean due to the generation of the fuel vapor on the basis of experiments or the like.

Figure 3:
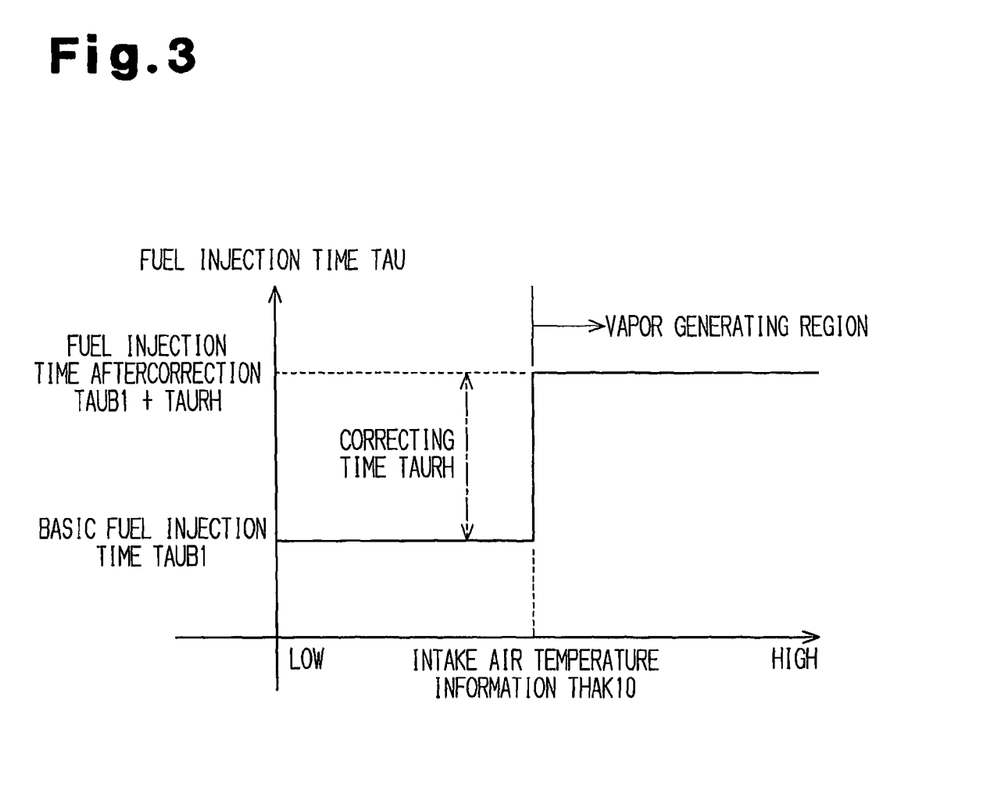
FIG. 3 is a graph showing a correction process of a fuel injection time in the fuel injection amount control in FIG. 2.

FIG. 3 shows a correction process of the fuel injection time TAU executed in step S104. In the present embodiment, in the case of adding the correction time TAURH to the basic fuel injection time TAUB1, the adequacy for deciding the fuel injection time is secured by using the selected intake air temperature information THAK10, that is, the larger value in the detected first intake air temperature THA1 and second intake air temperature THA2. The correction time TAURH is also a value which is previously stored as a value compensating the control command value of the fuel injection amount in the program memory (ROM) or the like of the ECU 40.

As mentioned above, in the present embodiment, if it is determined in step S103 that the engine environment at the time of starting exists in the warm-up environment region, the corrected fuel injection time TAU is set in S104 as a valve opening time of the injector groups 4A and 4B at the time of starting. Further, if it is determines in step S103 that the engine environment does not exist in the warm-up environment region, the fuel injection time TAU set in step S101 is set as the valve opening time of the injector groups 4A and 4B mentioned above at the time of starting.

If the engine reaches the autonomic operation and the engine system can obtain stationary flow of intake air through the traveling of the vehicle, the intake air amount EGA is set as follows on the basis of the outputs of the respective air flow meters 31 and 32, which also function as the intake air sensors.

$$EGA=EGA1+EGA2$$

Further, the intake air temperature THA is set as follows.

$$THA=(EGA1 \cdot THA1+EGA2 \cdot THA2)/EGA$$

The intake air amount and the intake air temperature determined as mentioned above are utilized as control parameters for the fuel injection amount control.

As described above, in accordance with the present embodiment, the advantages below can be obtained.

(1) The respective intake air temperature sensors (air flow meters 31 and 32) are provided for the two branch passages 12 and 13 branched in the upstream section in the intake passage 10. It is estimated (determined) whether the engine environment at the time of starting exists in the warm-up environment region, in which the fuel vapor tends to be generated in the fuel, by using the larger value of the first intake air temperature THA1 and the second intake air temperature THA2 detected through the intake air temperature sensors 31 and 32. Further, in the case that it is determined that the engine environment exists in the warm-up environment region, the structure is made such as to increase the fuel injection time at the time of starting on the basis of the larger value of the first intake air temperature THA1 and the second intake air temperature THA2. Accordingly, even if the engine environment at the time of starting exists in the warm-up environment region, in which the fuel vapor tends to be generated in the fuel, it is possible to prevent the air-fuel ratio from becoming lean due to the generation of the fuel vapor through the acceptable fuel injection amount control, and, by extension, it is possible to improve the startability of the engine.

(2) In order to estimate (determine) the engine environment at the time of starting mentioned above, the structure is made such as to refer to the value of the coolant temperature THW in addition to the intake air temperature information THAK10. Accordingly, the estimating (determining) accuracy of the engine environment is improved.

(3) The injection fuel amount is controlled by using the control command value which is increased on the basis of the value of the intake air temperature selected in the aspect mentioned above. Accordingly, the proper fuel injection amount control can be achieved in correspondence to the engine environment in each case.

A description will now be given of a second embodiment in which the fuel injection amount control apparatus in accordance with the present invention is applied to a fuel injection amount control apparatus of an internal combustion engine mounted to a vehicle with reference to FIGS. 4 to 5. The basic structure of the engine system to which the second embodiment is applied is the same as the structure of the engine system exemplified in FIG. 1.

In the present embodiment, it is further estimated whether the engine environment of the engine exists in an environment in which a cold air is taken into the engine in spite that the engine environment is in a non-cold state, for example, as in a case where the vehicle is used in a cold district. Further, in order to prevent the air-fuel ratio from becoming lean due to the intake of cold air having a high air density, the structure is made such as to further determine whether the fuel injection amount be increased, on the basis of the smaller value of the first intake air temperature THA1 and the second intake air temperature THA2.

Figure 4:
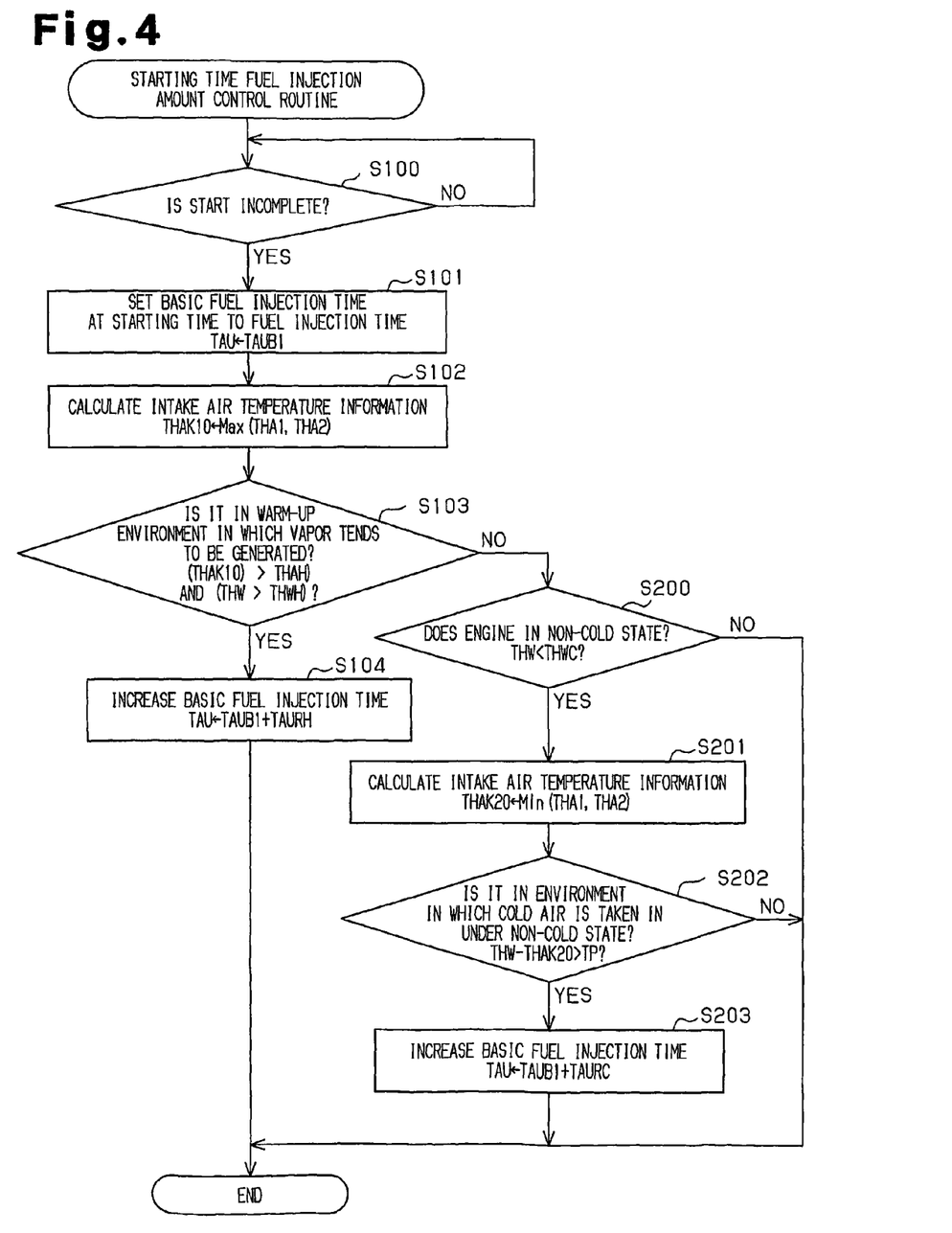
FIG. 4 is a flowchart showing a procedure of fuel injection amount control during starting of an engine in accordance with a second embodiment of the present invention.

FIG. 4 is a control procedure of a fuel injection amount control mentioned above in accordance with the present embodiment. A description will be given below of the control method on the basis of FIG. 4. The fuel injection amount control in accordance with the present embodiment has the same processes as the processes in the fuel injection amount control in accordance with the first embodiment. Accordingly, the same reference numerals are attached to the same processes and a description of the same processes is omitted, and a description will be given below mainly of the differences.

In the present embodiment, in the case that it is determined that the engine environment does not exist in the warm-up environment region, in which the fuel vapor tends to be generated in the fuel, through the determining process in step S103, as shown in FIG. 4, it is continuously determined in step S200 whether the engine exists in the non-cold state. Specifically, in the case that the coolant temperature THW detected through the coolant temperature sensor 33 is less than the cold determining value in connection with the coolant temperature, it is determined that the engine environment exists in the non-cold state. In this connection, the cold determining value THWC in connection with the coolant temperature is previously determined through experiments, and is stored in the program memory (ROM) of the ECU 40.

In step S200, if it is determined that the engine exists in the non-cold state, the intake air temperature information is again calculated in the next step S201. In step S201, the first intake air temperature THA1 and the second intake air temperature THA2 are compared to each other, which are detected from the first air flow meter 31 and the second air flow meter 32 also functioning as the intake air temperature sensor. The second embodiment selects the lower temperature value of the first intake air temperature THA1 and the second intake air temperature THA2 and sets the value to an intake air temperature information THAK20 at that time point, inversely to the first embodiment. In the environment such as the cold district, the cold air having the high air density is taken into the engine in the non-cold state. In this case, to select the smaller value of the detected first intake air temperature THA1 and second intake air temperature THA2 is a selection having a high adequacy for deciding the control command value of the fuel injection amount. In other words, this selection is a selection having a higher adequacy, that is, an acceptable selection for correcting the control command value so as to prevent the air-fuel ratio from becoming lean due to the intake of the cold air having the high air density.

Subsequent to the process of step S201, it is actually determined in step S202 whether the engine exists in an environment in which the cold air is taken in under the non-cold state, for estimating the environment of the engine. Specifically, in the case that a value obtained by subtracting the intake air temperature information THAK20 from the coolant temperature THW mentioned above is more than a deviation determining value TP, it is determined that the engine exists in the state in which the cold air is taken in under the non-cold state. In this case, the deviation determining value TP is a reference value used for the determination. The deviation determining value TP is also determined previously through experiments, and is stored in the program memory (ROM) of ECU 40.

If it is determined in step S202 that the engine exists in the environment mentioned above, the basic fuel injection amount is increased in the following step S203. Specifically, the fuel injection time TAU is set by adding a correction time TAURC to the basic fuel injection time TAUB1. The correction time TAURC is determined as a value which can prevent the air-fuel ratio from becoming lean due to the intake into the engine of the cold air having the high air density, through the experiments.

Figure 5:
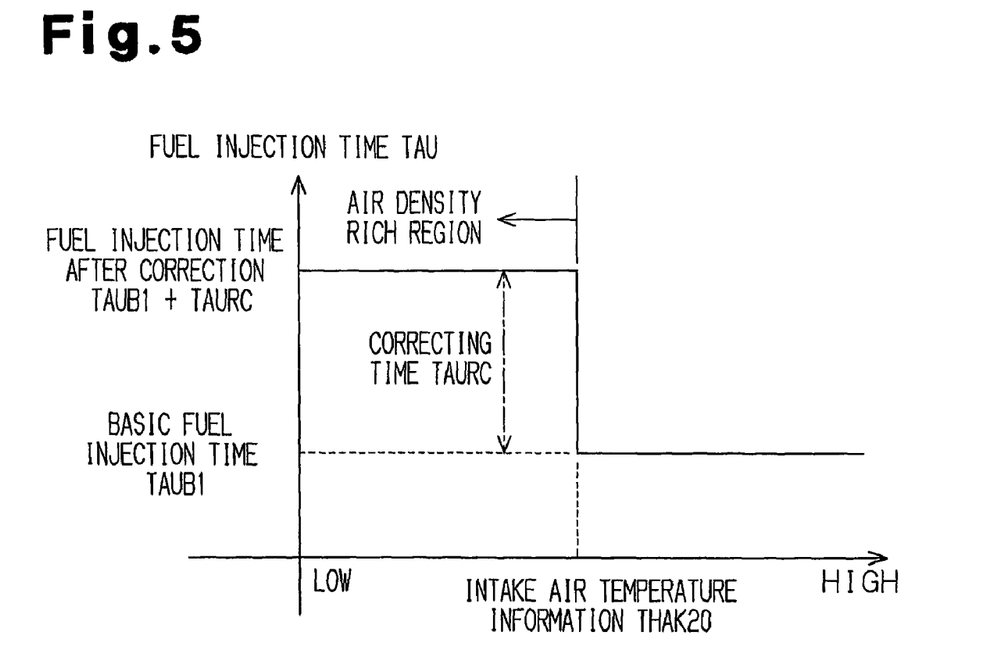
FIG. 5 is a graph showing a correction process of a fuel injection time in the fuel injection amount control in FIG. 4.

FIG. 5 shows a correction process of the fuel injection time TAU at the time of non-cold starting executed in step S203. In the present embodiment, in the case of adding the correction time TAURC to the basic fuel injection time TAUB1, the step is based on the selected intake air temperature information THAK20, that is, the smaller value of the detected first intake air temperature THA1 and the second intake air temperature THA2. Accordingly, the adequacy for determining the fuel injection time is secured. In this case, the correction time TAURC is a value which is previously stored as the value correcting the control command of the fuel injection amount in the program memory (ROM) or the like of the ECU 40.

As mentioned above, in accordance with the present embodiment, if it is determined in step S200 that the engine exists in the non-cold state, and it is determined in step S202 that the engine exists in the environment in which the cold air is taken in under the non-cold state, the fuel injection time TAU corrected through the process of step S203 is set as the valve opening time of each of the injector groups 4A and 4B at the time of starting the engine. Further, if it is determined in step S200 that the engine does not exists in the non-cold state, or if it is determined in step S202 that engine does not exists in the state in which the cold air is taken in under the non-cold state, the fuel injection time TAU set in the previous step S101 is set as the valve opening time of each of the injector groups 4A and 4B at the time of starting.

As described above, in accordance with the present embodiment, in addition to the advantages (1), (2) and (3) of the first embodiment, the following advantages are obtained.

(4) The intake air temperature sensor (air flow meters 31 and 32) are independently provided in the two branch passages 12 and 13 branched in the upstream section in the intake passage 10. It is estimated (determined) whether the engine environment at the starting time exists in the environment in which the cold air is taken in under the non-cold state, by using the smaller value of the first intake air temperature THA1 and the second intake air temperature THA2 detected through the intake air temperature sensors 31 and 32. Further, in the case that it is determined that the engine environment exists in the environment in which the cold air is taken in under the non-cold state, the fuel injection time at the time of starting is increased on the basis of the smaller value of the first intake air temperature THA1 and the second intake air temperature THA2. Accordingly, even if the engine environment at the time of starting exists in the environment in which the cold air is taken in under the non-cold state, it is possible to prevent the air-fuel ratio from becoming lean due to the intake of the cold air having the high air density through the acceptable fuel injection amount control.

Each of the embodiments mentioned above may be modified as follows.

In each of the embodiments, the correction time TAURH and the correction time TAURC are set to the fixed times. However, the correction time TAURH may be set in such a manner as to be longer in accordance that the value of the intake air temperature information THAK10 becomes higher. Further, the correction time TAURC may be set in such a manner as to be longer in accordance that the value of the intake air temperature information THAK20 becomes lower.

In the second embodiment, it is possible to execute the determination whether the engine exists in the state in which the cold air is taken in under the non-cold state, and the correction for increasing the fuel injection amount on the basis of the determination, independently from the determination whether the engine exists in the warm-up environment in which the fuel vapor tends to be generated, and the correction for increasing the fuel injection amount on the basis of the determination.

The present invention may be applied to a fuel injection amount control apparatus of an internal combustion engine which is provided with three or more branch passages and air flow meters provided in the respective branch passages. Further, although the air flow meter also functions as the intake air temperature sensor in the illustrated embodiments, the intake air temperature sensor may be independent from the air flow meter. In this case, the present invention may be applied as long as the respective intake air temperature sensors are provided in correspondence to a plurality of branch passages. Further, the control command value is not limited to be increased in accordance with the method in each of the embodiments. The correction so as to increase the control command value may be executed by directly determining the value corresponding to the result of the correction.

Further, the present invention is particularly effective when applied to the fuel injection amount control at the time of starting the engine. However, the present invention may be applied in the same manner even to the engine environment in which variation is generated in the detection values of intake air temperature sensors.

The invention claimed is:

1. A fuel injection amount control apparatus controlling an amount of fuel supplied to an internal combustion engine in correspondence to at least a temperature of air taken into the engine, an intake passage extending from the engine, and the intake passage being branched into a plurality of branch passages in an upstream section, the apparatus comprising:

a plurality of intake air temperature sensors each provided in one of the intake passages, each intake air temperature sensor detecting an intake air temperature in the corresponding intake passage; and a control portion controlling an amount of the fuel supplied to the engine by using a control command value, in correspondence to an engine state or an environment estimated on the basis of the intake air temperatures detected by the intake air temperature sensors, wherein, when estimating the engine state or the environment, the control portion selects a maximum value of the intake air temperatures respectively detected by the intake air temperature sensors, and estimates, on the basis of the maximum value, whether the engine is in a state in which a fuel vapor is generated, and wherein, when it is determined that the engine is in a state in which a fuel vapor is generated, the control portion controls the amount of the fuel supplied to the engine by using the control command value corrected on the basis of the maximum value of the intake air temperature.

2. The apparatus according to claim 1, further comprising a coolant temperature sensor detecting a coolant temperature of the engine, and the control portion estimates that the engine is in the state in which the fuel vapor is generated in the case that the maximum value in the intake air temperatures is more than a high temperature region determining value and the coolant temperature detected by the coolant temperature sensor is more than a high temperature region determining value.

3. The apparatus according to claim 1, wherein in the case that it is estimated that the engine is in the state in which the fuel vapor is generated, the control portion corrects the control command value in such a manner as to increase the amount of the fuel supplied to the engine.

4. A fuel injection amount control apparatus controlling an amount of fuel supplied to an internal combustion engine in correspondence to at least a temperature of air taken into the engine, an intake passage extending from the engine, and the intake passage being branched into a plurality of branch passages in an upstream section, the apparatus comprising:

a plurality of intake air temperature sensors each provided in one of the intake passages, each intake air temperature sensor detecting an intake air temperature in the corresponding intake passage; and a control portion controlling an amount of the fuel supplied to the engine by using a control command value, in correspondence to an engine state or an environment estimated on the basis of the intake air temperatures detected by the intake air temperature sensors, wherein, when estimating the engine state or the environment, the control portion selects a minimum value in the intake air temperatures respectively detected by the intake air temperature sensors, and estimates, on the basis of the minimum value, whether the engine is in an environment in which a cold air is taken into the engine under a non-cold state, and wherein, when it is determined that the engine is in an environment in which a cold air is taken into the engine under a non-cold state, the control portion controls the amount of the fuel supplied to the engine by using the control command value corrected on the basis of the minimum value of the intake air temperature.

5. The apparatus according to claim 4, further comprising a coolant temperature sensor detecting a coolant temperature of the engine, wherein, in the case that a difference of the minimum value in the intake air temperatures with respect to the coolant temperature is more than a deviation determining value, the control portion estimates that the engine is in the environment in which the cold air is taken into the engine under the non-cold state.

6. The apparatus according to claim 4, wherein, in the case that it is estimated that the engine is in the environment in which the cold air is taken into the engine under the non-cold state, the control portion corrects the control command value in such a manner as to increase the amount of the fuel supplied to the engine.

7. The apparatus according to claim 1, wherein the control portion estimates the state or the environment of the engine, and corrects the control command value on the basis of the estimation, at a time of starting the engine.

* * * * *